Patented Feb. 14, 1950

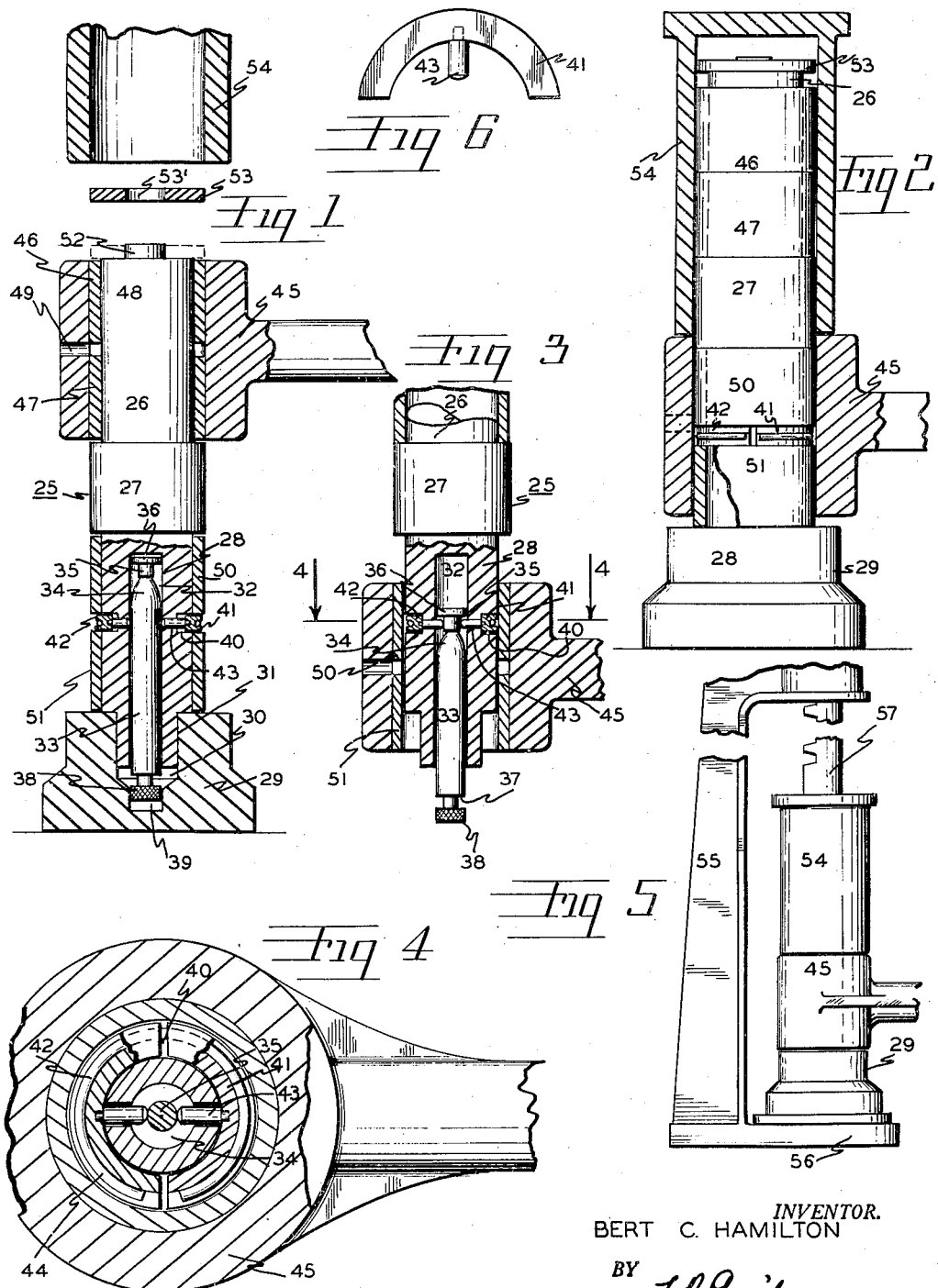

2,497,498

UNITED STATES PATENT OFFICE 2,497,498

BUSHING REMOVER AND REPLACER

Bert C. Hamilton, La Grande, Oreg.

Application April 22, 1948, Serial No. 22,667

2 Claims. (Cl. 29—283)

1

This application is a continuation in part of my co-pending application filed under date of April 12, 1948, Serial No. 20,438, and entitled "Means for removing and replacing tubular bushings" and relates in general to the same subject matter.

The invention described in my above mentioned co-pending application is concerned with the replacement of a single tubular or split bushing in a bearing. In some bearings, more particularly in bearings found in certain makes of automotive vehicles, a pair of bushings is placed in a bearing in place of a single bushing and an annular space is left inside the bearing between the adjacent edges of the two bushings to serve as an oil channel inside the bearing.

Thus, in placing a pair of new bushings in such a bearing, care must be taken not to push the bushings axially so far into the bearing that their inner edges will touch each other and thus obliterate the oil channel. Heretofore it has been customary to press one bushing in from one side of the bearing and then to press the second bushing in from the other side, taking care not to press either bushing in too far.

While the means described in my above mentioned co-pending application will serve for removing a pair of bushings of this type from a bearing, an attempt to use the same means for setting the pair of new bushings in the bearing would result in the two bushings being placed with their inner edges touching each other and thus without leaving the desired spacing to serve as the central annular oil channel.

The object of this present invention is to provide a means somewhat similar to that described in my above mentioned co-pending application, but which can be used for replacing a pair of old bushings with a pair of new bushings in substantially one main operation, and which will enable the replacing to be done quickly and easily.

A further object of the present invention is to provide a modified but simple and inexpensive device which can be employed either with a bearing containing a pair of bushings as above mentioned, or with a bearing in which but a single bushing is mounted.

The manner in which these objects are attained will be apparent from the following brief description with reference to the accompanying drawings, in which:

Fig. 1 is a vertical section of my modified bushing remover and replacer, illustrating the employment of the same for the replacement of a pair of bushings in a bearing; the parts being

2 illustrated as arranged in preparation for the operation of the device but the top ring and cap being shown separated and raised above the starting position for the sake of clarity;

Fig. 2 is a vertical section corresponding to Fig. 1 but illustrating the position of the members and parts when the replacement of the two old bushings by the two new bushings has been nearly completed;

Fig. 3 is a fragmentary vertical section of the lower portion of my device illustrating the removal of the device from the bearing after the new bushings have been set in place in the bearing and thus after the completion of the operation;

Fig. 4 is a fragmentary plan section on the line 4—4 of Fig. 3, but drawn to a larger scale;

Fig. 5 is an elevation showing my device employed in conjunction with a simple vise by means of which the required pressure is obtained for pushing out the old bushings and pressing in the new bushings; this figure corresponding to Fig. 2 but drawn to a slightly smaller scale; and Fig. 6 is a perspective view of one of the semicircular spacers for providing proper spacing between the adjacent inner edges of the pair of bushings when installed in the bearing.

A main member, 10 designated as a post, and which is indicated as a whole by the reference character 25 (Fig. 1), has an upper main cylindrical section 26, an intermediate cylindrical section 27 and a lower cylindrical section 28. The lower section 28 for the most part has a cylindrical surface of the same diameter as the upper section 26. The diameters of the upper and lower cylindrical sections 27 and 28 are made slightly less than the internal diameter of the bushings to be removed or installed so that the bushings will be slidable on either section. The diameter of the intermediate section 27 is larger and is slightly less than the external diameter of the bushings or the internal diameter of the bearing for the bushings, so that the bearing itself without the bushings will be slidable over the intermediate section 27. The post 25 is adapted to be removably set up in a base 29, and for this purpose the base 29 is formed with a top recess 30 which is of proper diameter to accommodate the stem 31 of reduced diameter at the bottom of the post 25.

A cylindrical channel 32 extends upwardly and axially through the stem portion 31 and through the lower main section 28 of the post 25. This interior channel 32 slidingly accommodates a spacer-adjusting plunger 33 which is shaped as shown in Figs. 1 and 3. The main portion of this plunger 33 is cylindrical, but the cylindrical body merges into a conical portion 34 near the top, which in turn is followed by a cylindrical neck 35 and the plunger finally terminates with an integral cap 36 of the same diameter as the main cylindrical body. The lower end of the plunger 33 is formed with a cut-out groove 37 so as to provide a bottom finger knob 38 for convenience in manually adjusting the position of the plunger in the post 25 when the post is removed from its base 29. The reason for such adjustment will be explained later. The recess 30 in the base 29 has a central well 39 to accommodate freely the bottom end or knob 38 of the plunger 33.

An annular groove 40 extends around the lower main cylindrical section 28 of the post 25 at its approximate center. In this groove 40 are located two semi-circular identical spacers 41 and 42, one of these being shown more clearly in Fig. 6. A pin 43 extends radially inwardly from each of these spacers and radial channels are provided in the post 25 and extend from the groove 40 to the central channel 32 and thus permit the pins 43 to slide radially in or out in the post 25 when the spacers are being moved into their inner or outer position in their groove 40. The outer peripheries of the spacers 41 and 42 are grooved in order to hold a curved wire spring 44 (shown more clearly in Fig. 4), the purpose of which wire spring is to exert constant external inward pressure on the spacers 41 and 42 so as to tend to move them always to their innermost position in the groove 40 of the post 25.

In the drawings the reference character 45 designates a connecting rod having a cylindrical bearing adapted to have a customary pair of spaced bushings mounted therein. In Fig. 1 the reference characters 46 and 47 designate the old bushings which are to be removed from the bearing 45 and which are to be replaced by the new bushings; and the reference characters 50 and 51 indicate the new bushings which are to be placed in the bearing 45. It will be noted that the old bushings 46 and 47 have their inner edges properly spaced slightly apart, thus leaving an interior annular channel 48 into which lubricant is introduced through the oil hole 49 in the bearing.

A concentric circular boss 52 (Fig. 1) is formed on the top of the post 25 to act as a positioning guide for a ring member 53. The central hole 53' in the ring member 53 is approximately the same diameter as the boss 52. The external diameter of the ring member 53 is the same as the diameter of the intermediate cylindrical section 27 of the post 25.

A cap member 54, as shown more completely in Fig. 2, completes my device. This cap member has an inside cylindrical surface, the diameter of which corresponds to the diameter of the bearing surface of the connecting rod 45 and thus the cap member 54 is of proper dimension to slide over the ring 53 and also over the intermediate section 27 of the post 25.

From Fig. 3 and Fig. 1 it will be apparent that, when the plunger 33 is pulled downwardly in the post 25 until the plunger neck 35 is in registration with the pins 43, the semi-circular spacers 41 and 42, pressed inwardly by their spring 44, will move to their innermost position as illustrated in Fig. 3 with the inner ends of the pins 43 having bearing contact with the plunger neck 35. When the spacers 41 and 42 and their spring 44 are so arranged, the spacers and spring lie entirely within the outer cylindrical surface of the section 28 of the post 25, and thus a bushing, such as the bushing 50, can easily be slid on or off the lower section 28 of the post. However, if there is no outer bushing to prevent outward movement of the spacers 41 and 42 then the thrusting of the plunger 33 upward, for example to the position shown in Fig. 1, will force the spacers 41 and 42 outwardly causing them to extend out beyond the cylindrical surface of the section 28 of the post. The inner ends of the pins 43 are rounded slightly to facilitate their sliding engagement with the surface of the plunger, and the top diameter of the conical portion 34 of the plunger 33, at its junction with the cylindrical neck 35, is preferably reduced to a diameter slightly less than that of the neck portion so as to form a slight recess. This slight recess facilitates the sliding of the ends of the pins 43 from the neck 35 and on to the conical surface 34 when the plunger is thrust upwardly from the position illustrated in Fig. 3 to that shown in Fig. 1 for the purpose of moving the spacers outwardly.

When it is desired to replace a pair of old bushings in a bearing, such as the bearing in the rod 45, by a pair of new bushings, the post 25 is lifted from the base 29 and the plunger 33 is pulled downwardly causing the spacers 41 and 42 to assume their innermost position. With the plunger remaining in this position one of the new bushings desired for the bearing, thus the bushing 50, is placed on the lower end of the post 25 and slid upwardly past the spacers 41 and 42 until this bushing engages the shoulder at the lower edge of the intermediate section 27 of the post. Then the plunger 33 is thrust upwardly so as to move the spacers 41 and 42 to their outward position below the bottom edge of the bushing 50. The second bushing 51 is now slid on to the lower end of the post and the post with the two bushings 50 and 51 in the positions shown in Fig. 1 is set up in the base 29. If a simple vise, such as the vise 55 of Fig. 5 is to be used for applying the necessary pressure required for pressing out the old bushings and pressing in the new bushings, the base 29 of the device is placed on the base 56 of the vise. With the cap 54 and guiding ring 53 removed, the operator slides the connecting rod bearing with its pair of old bushings 46 and 47 down over the upper section of the post 25 as illustrated in Fig. 1. The ring 53 is next set in place on the post around the boss 52. Finally the cap 54 is set down over the ring 53 and thus the cap 54 will be resting on the bearing in which the replacement of the bushings is to take place.

Pressure is now applied to the top of the cap 54 in order to force the cap and bearing downwardly over the post 25. Assuming that the vise 55 (Fig. 5) is to be used for applying this pressure, the operator will hold the rod 45 substantially in horizontal position with one hand while operating the vise with the other hand so as to cause the vise jaw 57 to move forcibly downwardly on the cap 54. The effect of this downward force on the cap 54, as apparent from Figs. 5 and 2, will be to push the bearing first down over the intermediate section 27 of the post 25 and in so doing to cause the old bushings 46, 47 to be pushed out of the bearing, and then, as the bearing is moved further down over the lower section 28 of the post, to force the new bushings 50 and 51 into the bearing. The spacers 41 and 42 will of course keep the new bushings spaced the proper distance apart as the bearing is pushed down over them, and the oil hole 45 of the bearing will finally be positioned over one of the spacers when the downward pressure is to be discontinued.

When the bearing has been moved down over the new bushings the vise 55 is opened, the cap 54 is lifted off of the post, and the bearing with the post held therein, is lifted from the base 29. The operator then pulls the plunger 33 downwardly to the position shown in Fig. 3. This causes the spacers 41 and 42 to be retracted to their innermost position and permits the bearing with the two new bushings properly positioned therein to be slid off the lower section of the post. Finally the old bushings 46 and 47 are slid off the top of the post and discarded.

The function of the ring 53, as evident, is to enable the cap 54 to be positioned quickly and accurately in preparation for the downward pressure on the cap. Thus with the ring 53 in place the bottom edge of the cap will not engage the old bushings but will properly move down over the old bushings 46 and 47 and over the intermediate section 27 of the post as the cap thrusts the bearing down on to the new bushings.

Various other means could of course be used for exerting the necessary downward pressure on the cap 54 and on the bearing. Any simple quick-acting means will suffice, since the entire operation with my device need require only a minimum of time and effort.

If a single bushing is desired in the bearing in place of the pair of smaller bushings, my same device can be used provided the plunger 33 and spacers 41 and 42 are first removed from the post. This removal of the spacers is done by slipping the wire spring 44 off of the spacers and permitting the two spacers to slide out entirely from their groove and thus permitting the plunger to be entirely withdrawn from the post. The operation of the device then follows in a manner similar to that previously described with the exception of course that a single bushing is placed over the lower section 28 of the post instead of the pair of bushings previously mentioned.

In the drawings I have shown the spacers 41 and 42 as being semi-circular, thus only two of them being required. A greater number could of course be used. With some sizes of bearings I prefer to have four spacers, each approximately a quarter of a circle in length and each having a pin sliding in a channel and engaging the plunger in the same manner. Other modifications could also be made without departing from the principle of my invention.

I claim:

1. In a device of the character described for removing and replacing a pair of spaced bushings, a post member having upper and lower main cylindrical sections of the same diameter, a shoulder of larger diameter separating said main sections, an annular groove in one of said main sections, a plurality of spacers in said groove and radially slidable therein, said groove being of sufficient depth radially to enable said spacers to be entirely contained within said groove when said spacers are in their innermost position, spring means normally holding said spacers in said innermost position, an axial channel in said grooved main section, branch radial channels connecting said axial channel with said groove, engageable elements extending through said branch radial channels to said spacers, a manually-operable plunger located in said axial channel and extending beyond the end of said post member, and a cam surface on said plunger arranged for engagement with said engageable elements for moving said spacers outwardly in said groove against the force of said spring means.

2. In a device of the character described for removing and replacing a pair of spaced bushings, a post member having upper and lower main cylindrical sections of the same diameter, a shoulder of larger diameter separating said main sections, the diameters of said main sections being approximately equal to the internal diameter of said bushings and the diameter of said shoulder being approximately equal to the external diameter of said bushings, an annular groove in said lower main section, a plurality of spacers in said groove and radially slidable therein, said groove being of sufficient depth radially to enable said spacers to be entirely contained within said groove when said spacers are in their innermost position, means normally holding said spacers in said innermost position, an axial channel in said lower main section, said channel connected with said groove, a manually-operable element located in said axial channel and extending beyond the end of said post member, means actuated by said manually-operable element for moving said spacers outwardly in said groove against the force of said first mentioned means, and a removable base for said post member.

BERT C. HAMILTON.

REFERENCES CITED

The following references are of record in the file of this patent:

UNITED STATES PATENTS

| Number | Name | Date |
| --- | --- | --- |
| 976,325 | Wheeler et al. | Nov. 22, 1910 |
| 1,589,633 | Dunton et al. | June 22, 1926 |
| 1,736,529 | Goeller | Nov. 19, 1929 |
| 1,897,737 | Snarr | Feb. 14, 1933 |
| 1,981,925 | Russell et al. | Nov. 27, 1934 |

FOREIGN PATENTS

| Number | Country | Date |
| --- | --- | --- |
| 1,830 | Great Britain | May 21, 1919 |
| 18,977 | Great Britain | Aug. 18, 1909 |